(12) United States Patent
Holbrook

(10) Patent No.: US 9,393,756 B2
(45) Date of Patent: Jul. 19, 2016

(54) HOUSEHOLD TEXTILE PRODUCT WITH ANTI-SLIP EFFECT

(71) Applicant: Standard Fiber LLC, Burlingame, CA (US)

(72) Inventor: Russ Holbrook, Matthews, NC (US)

(73) Assignee: Standard Fiber LLC, Burlingame, CA (US)

( * ) Notice: Subject to any disclaimer, the term of this patent is extended or adjusted under 35 U.S.C. 154(b) by 0 days.

(21) Appl. No.: 14/278,253

(22) Filed: May 15, 2014

(65) Prior Publication Data

US 2015/0158266 A1    Jun. 11, 2015

(30) Foreign Application Priority Data

Dec. 11, 2013    (CN) ..................... 2013 2 0813469 U

(51) Int. Cl.
*B32B 3/02* (2006.01)
*B32B 3/10* (2006.01)
*B32B 5/02* (2006.01)

(52) U.S. Cl.
CPC ... *B32B 3/10* (2013.01); *B32B 5/02* (2013.01); *B32B 2250/02* (2013.01); *B32B 2307/744* (2013.01); *Y10T 156/10* (2015.01); *Y10T 428/24802* (2015.01); *Y10T 428/249921* (2015.04)

(58) Field of Classification Search
CPC .... B32B 3/30; B32B 3/363; B32B 2307/744; Y10T 428/2481; Y10T 428/24033; Y10T 442/2344
See application file for complete search history.

(56) References Cited

U.S. PATENT DOCUMENTS

| | | | | |
|---|---|---|---|---|
| 4,317,244 A | * | 3/1982 | Balfour-Richie | .... A47G 9/0246 5/482 |
| 2003/0213269 A1 | * | 11/2003 | Peeler et al. | ..................... 66/171 |
| 2003/0232556 A1 | * | 12/2003 | Toro | ...................... A61F 13/514 442/286 |
| 2004/0066068 A1 | * | 4/2004 | Nazginov | ....................... 297/228 |
| 2004/0172763 A1 | * | 9/2004 | Sachs | ..................... A47C 7/021 5/656 |
| 2009/0218861 A1 | * | 9/2009 | Conforti | ........................ 297/223 |
| 2013/0320721 A1 | * | 12/2013 | Cortellazzi | .................... 297/224 |
| 2014/0082840 A1 | * | 3/2014 | Khowaylo | ........... A47G 9/0246 5/499 |

FOREIGN PATENT DOCUMENTS

DE    102010051704 A1 * 11/2010
WO    WO 2005/107531    * 11/2005

* cited by examiner

*Primary Examiner* — Elizabeth Mulvaney
(74) *Attorney, Agent, or Firm* — Levenfield Pearlstein, LLC

(57) ABSTRACT

A household textile product has an anti-slip effect in which a household textile product body is provided with anti-slip material. The anti-slip material is distributed in one or combination of an array of dots at equal or unequal distances from each other, the anti-slip material can be provided in the form of multiple wavy lines, in the form of multiple diamond-shaped anti-slip dots distributed equidistantly in an array, or in the form of a grid structure formed by criss-crossing sloping lines. A side of the textile product can be provided with anti-slip material.

11 Claims, 3 Drawing Sheets

HOUSEHOLD TEXTILE PRODUCT WITH ANTI-SLIP EFFECT

BACKGROUND

The present disclosure relates to household textiles, in particular to a household textile product with an anti-slip effect.

Existing household textile products such as mattresses, mattress cases, mattress covers, seat cushions, sofa covers, cushions, cushion cases and the like, whether they contain a filling or not, are prone to movement when the human body moves on top of the product. As shown in the example of FIG. 1, when a person applies a force from the top or side of the product, the entire product (e.g., mattress) moves readily. Such movement has an impact on its performance and comfort.

Accordingly, there is a need for a household textile product with an anti-slip effect. Desirably, such a product addresses the problem afflicting existing products, namely the tendency to slide in use. More desirably, such a product increases the friction between the base of the product and its support, avoiding undesirable movement of the household textile product.

SUMMARY

A household textile product with an anti-slip effect includes a household textile product body. A base of the textile product body is provided with anti-slip material. The present household textile product provides a product with an anti-slip effect which addresses a problem afflicting existing products, namely a tendency of the product to slide in use.

In use, the anti-slip material can increase the friction between the base of the textile product and its support, avoiding undesirable movement of the household textile product. The present household textile product addresses this problem by providing a textile product body, with a base of the textile product body provided with an anti-slip material.

The anti-slip material can be distributed in one or a combination of an array of dots at equal or unequal distances from each other, in the form of multiple wavy lines, in the form of multiple diamond-shaped anti-slip dots distributed equidistantly in an array, or in the form of a grid structure formed by criss-crossing sloping lines.

The product can also be formed with a side of the textile product provided with anti-slip material.

The textile product can be formed such that the base of the product body to which the anti-slip material is attached, is fixed directly to the base or to a side of the textile product by piecing, blanket stitching or bonding, or it can be fixed by means of a direct or indirect zip structure.

Advantageously, the present household textile product prevents slipping of the product relative to its support (the structure on which it is positioned), compared to existing products with the addition of a layer of thin anti-slip material which increases the friction between the textile product base and its support, making the household textile product less prone to movement in use.

More advantageously, the present household textile product can be used in household textile products with or without a filling, such as mattresses, mattress cases, mattress covers, seat cushions, seat cushion cases, cushions, cushion cases, sofa covers and the like.

These and other features and advantages of the present invention will be readily apparent from the following detailed description, in conjunction with the claims.

BRIEF DESCRIPTION OF DRAWINGS

The benefits and advantages of the present invention will become more readily apparent to those of ordinary skill in the relevant art after reviewing the following detailed description and accompanying drawings, wherein.

DETAILED DESCRIPTION

Figure 1:
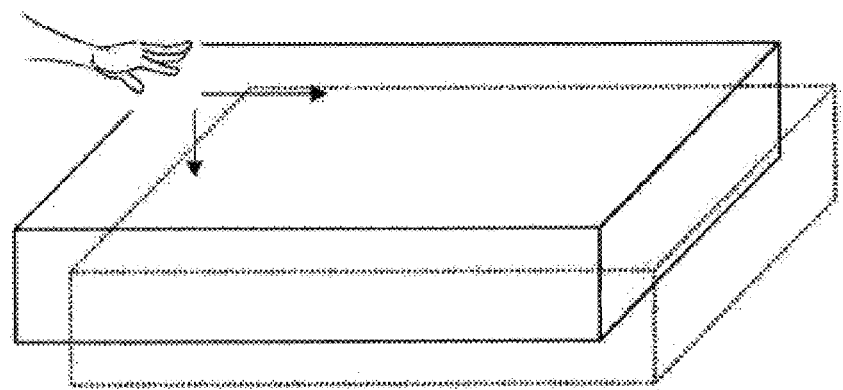
FIG. 1 is a schematic diagram showing an existing product in use.

While the present device is susceptible of embodiment in various forms, there is shown in the drawings and will hereinafter be described one or more presently preferred embodiments with the understanding that the present disclosure is to be considered an exemplification of the device and is not intended to limit the disclosure to the specific embodiment or embodiments illustrated.

Figure 2:
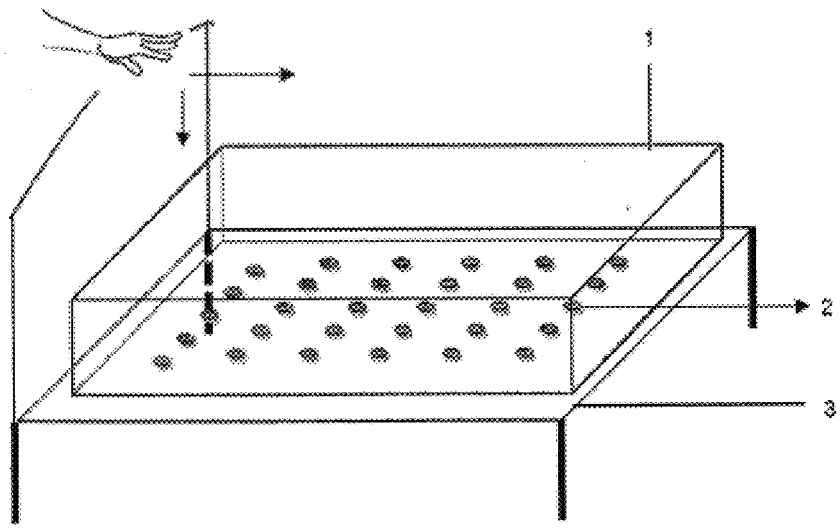
FIG. 2 is a structural schematic diagram of an embodiment of the household textile product with anti-slip effect.

Referring to FIG. 2, there is shown a structural schematic diagram of an embodiment 1 of the household textile product with anti-slip effect. The illustrated example is of a mattress structure. The base of a mattress body 1 is provided with anti-slip material 2 distributed in the form of dots. The dots 2 of anti-slip material may be distributed equidistantly in the form of an array as shown in FIG. 2, or distributed at unequal distances, e.g., randomly (not shown), but a certain density should be maintained on the base of the mattress body 1, and the dots 2 should be scattered to a certain extent.

The anti-slip material may be PVC, silica gel, EVA, rubber or certain organic or inorganic resins, etc., and the dots 2 thereof may be applied to the base of the mattress body 1 by methods such as micro-injection molding, textile printing or coating. The dots 2 have a diameter of about 0.1 to 1.0 cm. In use, one side of the anti-slip material must be in direct contact with the bed board 3 in order to achieve the anti-slip effect.

Figure 3:
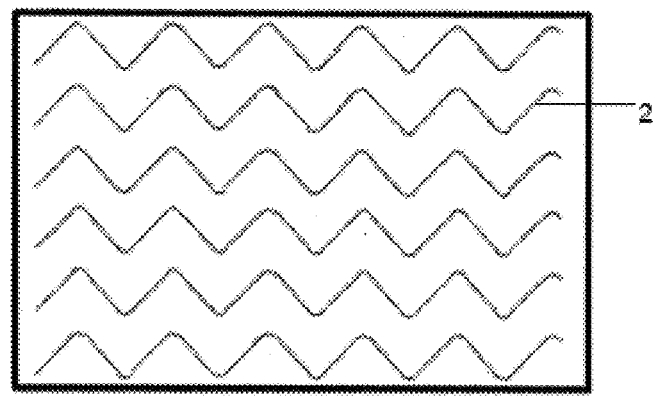
FIG. 3 is a structural schematic diagram of another embodiment of the household textile product with anti-slip effect present.

Referring now to FIG. 3, there is shown a structural schematic diagram of another embodiment of the household textile product with anti-slip effect. In this illustrated embodiment, the product is in the form of a mattress case. The base of the mattress case includes the anti-slip material formed as multiple wavy lines 2 of anti-slip material. The wavy lines 2 are distributed relatively evenly on the base of the mattress case. The wavy lines 2 of anti-slip material provide an anti-slip effect.

Figure 4:
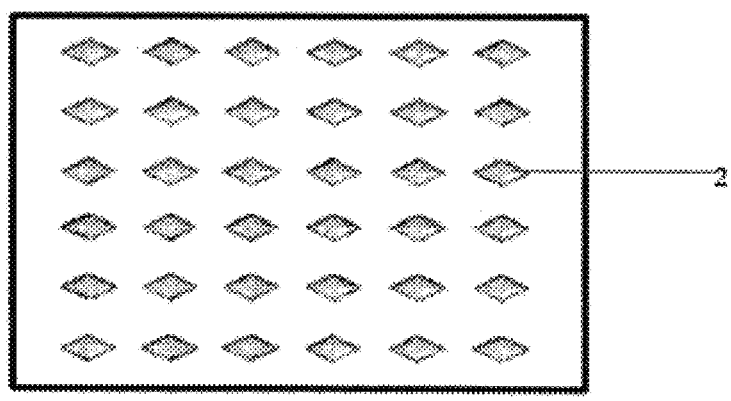
FIG. 4 is a structural schematic diagram of still another embodiment of the household textile product with anti-slip effect.

FIG. 4 illustrates yet another embodiment in which is a seat cushion case has, on its base, multiple diamond-shaped anti-slip dots 2 that are formed in an equidistantly distributed array of anti-slip material. The diamond-shaped dots 2 of anti-slip material are distributed relatively evenly on the base of, for example, a seat cushion 4 case. This embodiment prevents slippage between the seat cushion case 4 and a chair (not shown), avoiding unnecessary movement of the seat cushion 4 in use.

Figure 5:
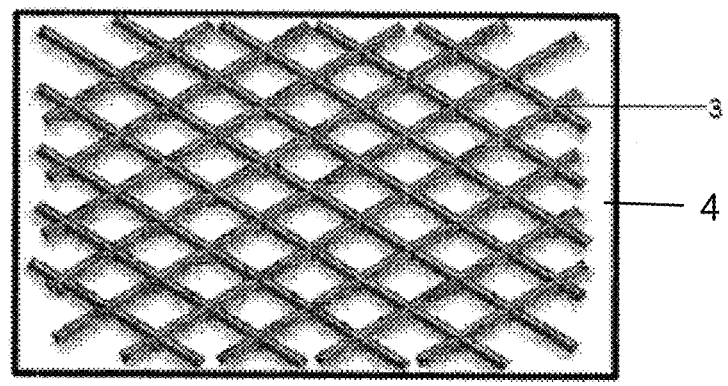
FIG. 5 is a structural schematic diagram of yet another embodiment of the household textile product with anti-slip effect.

As seen in FIG. 5, the seat cushion base 4 is formed with a grid structure 3 formed by criss-crossing sloping lines of anti-slip material. The grid structure 3 enables the anti-slip material to be distributed relatively evenly on the base of the seat cushion 4. The effect of this in use is to prevent slippage between the seat cushion 4 and the chair, avoiding unnecessary movement of the seat cushion 4 in use.

Figure 6:
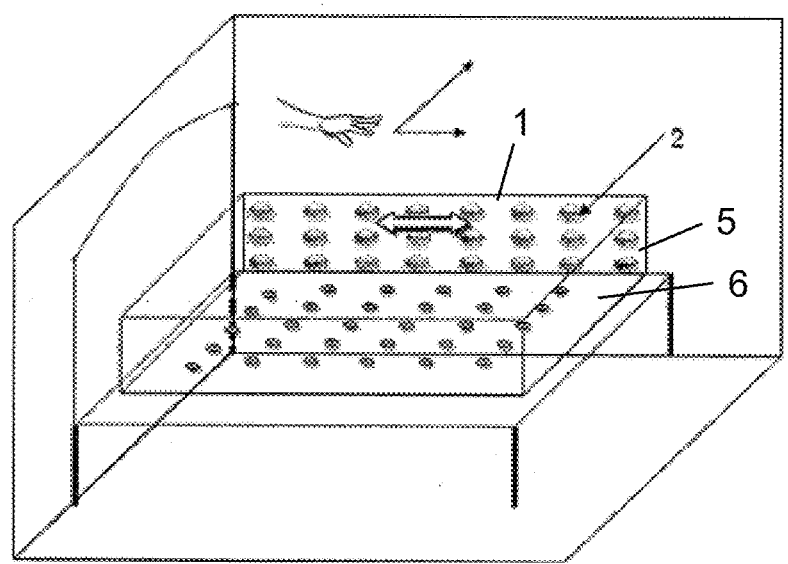
FIG. 6 is a perspective illustration of the household textile product with anti-slip effect.

Other structures are also contemplated. For example, as seen in FIG. 6, in addition to the base, a side 5 of the body of the household textile product 1 can be provided with anti-slip material as desired for a particular use. For example, as shown in FIG. 6, the structural arrangement and material selection on the side 5 may be the same as on the bottom surface 6. It can, of course, be applied in a different pattern as well.

Moreover, the base of the household textile product body 1 to which the anti-slip material is attached can be fixed directly to the base or side of the product or by piecing, blanket stitching, bonding, or the like, or it can be fixed by a direct or indirect zip structure.

Contemplated base structures of the household textile product body to which the anti-slip material is attached can be, for example, an apron-less structure that forms a mattress structure, an apron added to the base in a vertical direction, with an elastic band fixed by blanket stitching or piping to the lowermost end of the apron to form a mattress cover structure, an apron added to the base in a vertical direction, with a single layer of cloth added to the bottom of the apron, to form a mattress case structure.

All the above-mentioned structures and uses are preferred embodiments of the present disclosure and are not intended to limit the scope of the present disclosure. Accordingly all changes and modifications to the present disclosure are within the scope of the present disclosure.

The directional references of top, bottom, upper, lower and side are provided for reference only and are not intended to limit the disclosure in any way.

All patents referred to herein, are incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover by the appended claims all such modifications as fall within the scope of the claims.

What is claimed is:

1. A household textile product with an anti-slip effect configured for attachment to a household product, comprising:
a household textile product body defining an interior space configured to receive the household product, the household textile product body having a textile base for positioning over a surface of the household product and a plurality of side surfaces extending from the base, wherein the textile base and a single side surface of the plurality of side surfaces of the textile product body are provided with anti-slip material for frictionally engaging one or more adjacent support structures to resist slipping movement of the household product relative to the one or more adjacent support structures.

2. The household textile product of claim 1, wherein the anti-slip material is distributed in an array of dots at equal or unequal distances from each other.

3. The household textile product of claim 1, wherein the anti-slip material is in the form of multiple wavy lines.

4. The household textile product of claim 1, wherein the anti-slip material is in the form of multiple diamond-shaped dots distributed equidistantly in an array.

5. The household textile product of claim 1, wherein the anti-slip material is formed as a grid structure formed by criss-crossing, sloping lines.

6. The household textile product of claim 1, wherein a side of the household textile product body opposite the anti-slip material is provided with an anti-slip material.

7. The household textile product of claim 1, wherein the base of the household textile product body to which the anti-slip material is attached is fixed directly to the base or a side of the household product by piecing, blanket stitching, bonding, or a direct or indirect zip structure.

8. An anti-slip bedding textile product comprising:
a body having a base surface, vertical side surfaces extending from the base surface, and a single layer of cloth at a bottom of the vertical side surfaces, the base surface and a single one of the vertical side surfaces having an anti-slip material disposed thereon, wherein the body is configured to fit around a mattress.

9. The household textile product of claim 1, wherein the anti-slip material is selected from: PVC, silica gel, rubber, an organic resin and an inorganic resin.

10. The household textile product of claim 1, wherein the anti-slip material is applied to the textile base by micro-injection molding.

11. The household textile product of claim 1, wherein the household textile product body is attached to the household textile product by one of: piecing, blanket stitching, and a direct or indirect zip structure.

\* \* \* \* \*